June 21, 1938.   C. BARBIERI   2,121,332
APPARATUS FOR THE SEPARATION OF SATURATED AND UNSATURATED HYDROCARBONS
Filed July 17, 1936   2 Sheets-Sheet 1
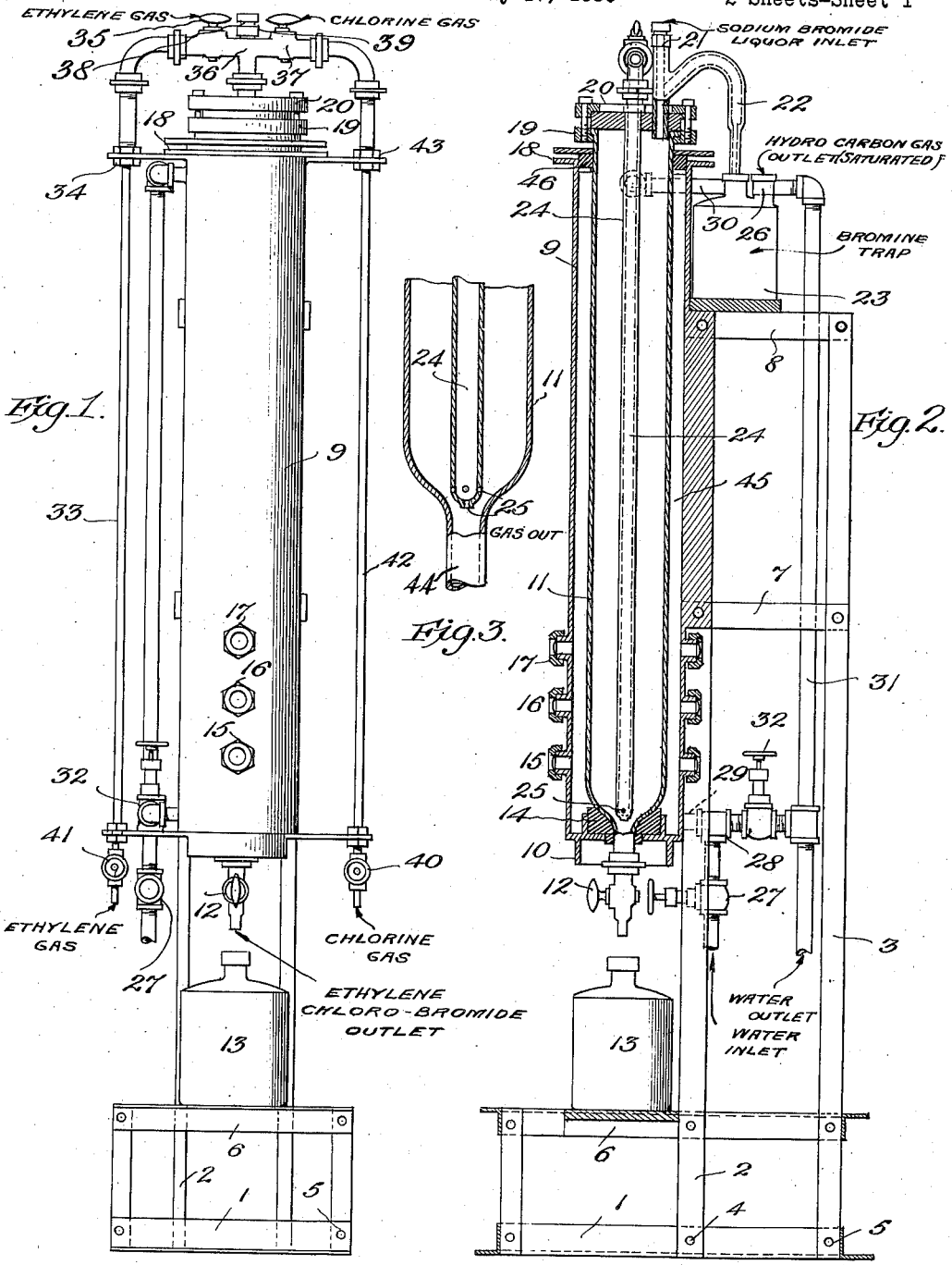
INVENTOR
CESARE BARBIERI
BY
ATTORNEY

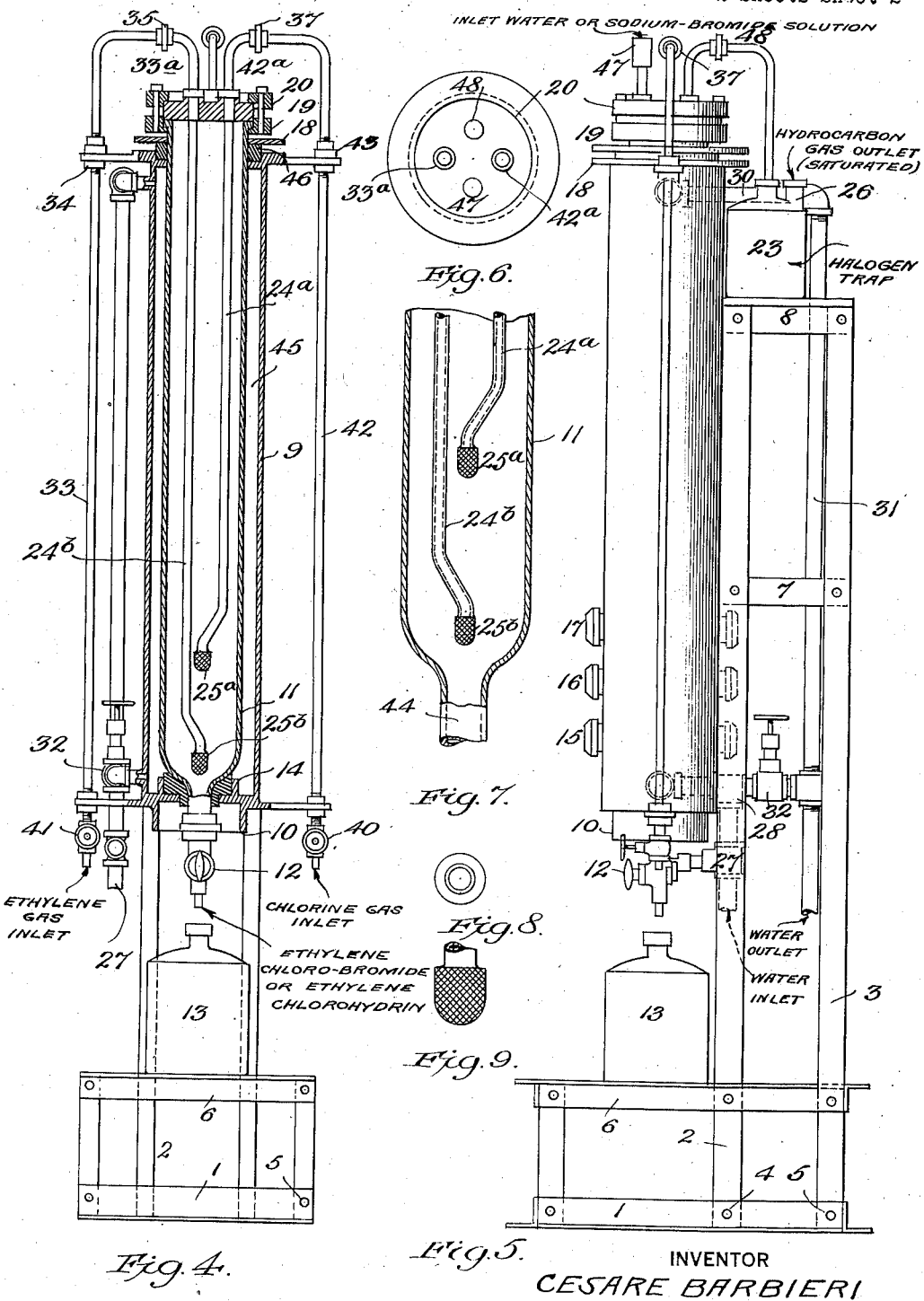

Patented June 21, 1938

2,121,332

UNITED STATES PATENT OFFICE 2,121,332

APPARATUS FOR THE SEPARATION OF SATURATED AND UNSATURATED HYDROCARBONS

Cesare Barbieri, New York, N. Y.

Application July 17, 1936, Serial No. 91,244

5 Claims. (Cl. 261—121)

The present invention relates to an apparatus for the separation of saturated and unsaturated hydrocarbons.

It is well known in the art that one of the most generally used systems for the separation of saturated and unsaturated hydrocarbons was known as the "Linde" process. This process was dependent for satisfactory results upon attaining and maintaining excessively high pressures and extremely low temperatures. These intense pressures required equipment and machinery having considerable weight and structural strength and involving expensive steel forgings and constructions. In addition, the multiplicity of pumps and other auxiliaries for maintaining the required temperatures and pressures necessarily require heavy foundations which precluded the movement of the equipment from one site of operation to another. In order to avoid some of the shortcomings of the aforesaid, absorption systems were attempted. Thus, the sulfuric acid process was attempted, but it presented difficulties of operation as a result of corrosion and sludge formation which militated against the practical value of this process. The formation of sludge which contained a large portion of the unsaturated components of the hydrocarbon material was objectionable since the disposal of the acid sludge was generally restricted by Federal or State laws or local ordinances or even prohibited thereby. In addition, the unsaturated hydrocarbon compounds in the sludge were lost for all practical purposes. Another system which was proposed was the "Kaselitz" process, using dilute bromine solution. Kaselitz required cumbersome equipment of large capacity, due to the low concentration of his dilute solution. This naturally made it impractical and impossible for the equipment to be mobile.

The aforesaid systems required large and massive equipment and required special outlets for the disposal of corrosive wastes or byproducts and therefore could not use mobile apparatus nor inexpensive equipment because the size of the units necessitated a high capital cost and relatively expensive operation. Although many attempts and proposals have been made, none, so far as I am aware, has been wholly satisfactory and successful when carried into practice on an industrial scale.

The present invention has solved the outstanding problem and has provided a practical absorption tower for the separation of gaseous saturated and unsaturated hydrocarbons, i. e. hydrocarbons having a true ethylenic linkage, in an efficient and satisfactory manner that does not require heavy and massive equipment built to withstand high pressures, eliminates the disposal of acid wastes and byproducts, and does not require units of enormous capacity nor extensive auxiliaries such as pumps, etc.

It is an object of this invention to provide a light weight, mobile absorption tower capable of separating saturated and unsaturated hydrocarbons in an effective and efficient manner and capable of use on an industrial scale for commercial production.

It is another object of this invention to provide an absorption tower which can be moved from place to place with a minimum of labor, e. g. it may be set up, tested for leak or operation, and then moved without dismantling to a plant for continued use.

It is a further object of this invention to provide an absorption tower which does not require a large number of auxiliaries.

The invention also contemplates the provision of a reaction chamber of such construction that the chemical reactions may be carried out in darkness and in the absence of light or other activating rays.

It is likewise within the contemplation of the invention to provide a relatively inexpensive apparatus for the absorption of unsaturated hydrocarbon gases from mixed hydrocarbon gases.

Other objects and advantages will become apparent from the following description of an absorption tower taken in conjunction with the drawings, in which:—

Fig. 1 is a front elevation of an absorption tower embodying the invention;

Fig. 2 shows a side elevation partly in section of my absorption tower illustrated in Fig. 1;

Fig. 3 is an enlarged, fragmentary view of the bubbler used in the absorption tower;

Fig. 4 is a front elevation of a modified embodiment of my absorption tower;

Fig. 5 is a side elevation of the modified embodiment of my absorption tower illustrated in Fig. 4;

Fig. 6 is a top elevation of the cover of the modified embodiment of my absorption tower illustrated in Fig. 4;

Fig. 7 illustrates the spatial relation of a distributing system for gaseous reactants;

Fig. 8 is a top elevation of a dispersing or bubbling element; and

Fig. 9 is a side elevation of a disperser or bubbler.

Broadly stated, my absorption tower comprises a frame work, platforms for a receiver and for traps, piping, an outer substantially light-tight metallic protective vessel and an inner glass or other corrosion resistant reaction vessel. The frame work of standard angle iron supports the other equipment. The platforms for the product receiver and the traps are an integral part of the frame work. Thus the entire tower may be moved from place to place as the exigencies of operation demand. All that is necessary to prepare the tower for transportation after operation has ceased at one location is to disconnect the piping for the hydrocarbon gases, the chlorine gas, and the cooling medium from the sources of supply and move the tower.

The frame work is of angle iron or a standard steel shape constructed to allow for the strains of operation and movement. Integral parts of the frame work are the platforms for the product receiver, the bromine trap, and the platforms (not shown) for the operators.

In Fig. 2 is illustrated a side elevation partly in section of the portable absorption tower in which the reference character 1 designates an angle iron of suitable strength which together with others not shown forms a firm, though light, base for the separator. Members 2 and 3 are of angle iron or steel, serve as uprights and are riveted to the base members 1 by rivets 4 and 5 and others not shown. The transverse member 6 likewise of angle iron and others not shown serve not only to strengthen the structure and give rigidity thereto but also serve as a platform on which is placed the receiver for the dihalide compounds of the unsaturated hydrocarbons. The structure is riveted as indicated with cross members 7 and 8, giving rigidity to the structure without any sacrifice of the advantage of portability. In addition to giving rigidity to the frame work, cross member 8 and others, not shown, provide a platform on which is placed the receiver or traps for any bromine, chlorine or halogen compound which may be carried over, mechanically or otherwise, by the escaping saturated hydrocarbon gases as they pass out of the apparatus. Metal cylinder 9 is of suitable strength and provided at its lower extremity with a flanged member 10 through which connection is made by suitable means between the inner tapered cylinder 11 and valve 12 which serves to draw off the dihalides of the unsaturated hydrocarbons into receiver 13. A cushion 14 of resilient material supports and protects the tapered reaction cylinder 11. Paired peepholes 15, 16, 17, of suitable construction are situated as indicated for the usual purposes. The flange 18 of outer cylinder 9, rests on the frame work and holds the cylinders in alignment. Ring 19 cooperates with the flanged portion of the inner cylinder to afford a means of securing the cover by suitable bolts and may be made gas- and liquid-tight by any well known means. A ring 46 of suitable resilient material serving to cushion and guide the inner reaction cylinder 11, is provided toward the upper extremity of cylinder 9. A suitable flanged cover 20 of the inner reaction cylinder is capable of being held to the inner cylinder 11 by appropriate bolts. Cover 20 also carries a threaded pipe 21 which is not only an inlet for the sodium bromide solution but with the gooseneck 22 serves as an outlet for the saturated hydrocarbon gases and bromine, the latter of which is collected in the properly baffled receiver 23 and others not shown while the hydrocarbons pass to other units through outlet 26. Receiver 23 may be of any convenient size, construction, and material. Cover 20 has a gas- and liquid-tight connection for the insertion of a tube 24 of non-corrodible material. Instead of the design shown there may be in cover 20 an inlet for sodium bromide solution and an inlet and outlet for gases. I prefer glass for tube 24 although I do not limit myself to the use of glass, through which the chlorine and hydrocarbon gases are led to the bottom of the reaction cylinder and there dispersed in such a way through holes 25, or a diffuser, that the gases rise in small bubbles through the surrounding sodium bromide and chloride solution and thereby set free bromine or with larger quantities of chlorine, chlorobromide. The unsaturated hydrocarbons react to form the dihalides, mostly the chlorbromide, but to a less extent dibromide and dichloride and are drawn off at the bottom through the valve 12 into receiver 13, which may be of any suitable material, shape and construction. The saturated hydrocarbon gases rise substantially unattacked through the solution of sodium salts of chlorine and bromine to escape through the gooseneck 22 into trap 23 where the bromine together with halogen compounds drops out and the saturated hydrocarbon gases are led off, to units of other operations, through connection 26.

The cooling system consists of valve 27 through which the water from an outside source enters the system and flows through T 28 and its nipple 29 into cooling space or jacket 45 between the outer and inner cylinders. The water rises through this space, cooling the inner cylinder to the required temperature, to flow out through pipe 30 and its connection to pipe 31 to waste. By means of valve 32 the cooling system may be drained, if desired.

The front elevation of the tower is illustrated in Fig. 1. By means of suitable valve 41, pipe 33 and reducer 34, the hydrocarbon gas is conducted to valve 35 through which it passes to cross 36. The introduction of hydrocarbon gas is alternated with chlorine gas. The chlorine gas from any suitable source passes through valve 40, pipe 42, reducer 43 and valve 37 into cross 36. Inspection is provided through nipple 39 and its plug 38.

The details of the construction of the member by which the incoming gases are dispersed and distributed as small bubbles throughout the liquid in reaction vessel 11 may be clearly seen by referring to Fig. 3. The chlorine gas and the hydrocarbon gases are admitted to the reaction vessel 11 through the glass tube 24 and by means of the tube 24 lead to a point near the lower extremity of the reaction vessel 11. In escaping from the tube 24 through the holes 25, the gases are dispersed into fine bubbles and as such pass through the chlorbromide solution and the solution of sodium bromide and sodium chloride thereby coming into intimate and efficient contact with the solution and reacting with evenness and smoothness. The alkylene dihalides thus formed being insoluble and of greater density than the other liquids contained in the reaction vessel fall to the bottom of the vessel 11 and are removed together with the waste solution of sodium chloride through 44 which is connected by suitable means to valve 12 (Fig. 2) through which the dihalides pass to receiver 13 (Fig. 2).

In the process of separating gaseous unsaturated hydrocarbons from gaseous saturated hydrocarbons using my novel absorption tower, the inner glass reaction vessel is partially filled with a concentrated solution of an inorganic bromide, preferably a concentrated solution of sodium bromide. This solution is introduced into the reaction vessel through a gooseneck, which also serves as an outlet for the unattacked saturated gaseous hydrocarbons, fitted to the flanged cover of reaction vessel 11. The outer shell is supported by the frame work described hereinabove. This shell is separated from the glass reaction chamber, and the space 45 thus formed permits the circulation at relatively low pressure and temperature of the cooling medium around the entire reaction chamber. Toward the bottom of this space is a cushion of resilient material which supports the reaction vessel. Near the upper extremity of this space is a ring of similar material which guides the reaction chamber and spaces the reaction chamber from the protective shell.

After the introduction of the bromide solution chlorine gas or other gaseous halogen is introduced into the bromide solution until the bromine liberated has combined with the excess of chlorine which is introduced to form chlorobromide. The resultant solution is the special brominating solution and is nearly colorless in contradistinction to the brownish color of the brominating solutions usually used.

The gaseous halogen is obtained from any suitable source of supply, such as a tank of compressed chlorine, and is conducted from that tank by means of suitable piping to a T located on the flanged cover of the protective vessel. The gaseous saturated and unsaturated hydrocarbons are obtained from any suitable source of supply, such as the by-product "gyro" gas of the petroleum refineries.

The tubes are tapered at the free end and provided with a plurality of openings or diffusers through which the gaseous hydrocarbons and the chlorine pass into the reaction solution. As an alternative the same tube may be used for the chlorine and for the hydrocarbon gases. The gaseous saturated and unsaturated hydrocarbons and chlorine bubble through the chlorobromide solution. The unsaturated hydrocarbons react with the halogens present to form dihalides and/or mixed dihalides while the saturated hydrocarbons pass out of the system practically unattacked. In leaving the system the saturated hydrocarbons pass through a trap or traps which remove any halogen compounds which may be entrained in the gases.

The unsaturated hydrocarbons, in the form of the dihalides, form a layer at the bottom of the reaction vessel and may be drawn off into the receiver as the operation requires. There is no difficulty in separating the dihalides of the unsaturated hydrocarbons from the saturated hydrocarbons and from the aqueous solution such as there is in other methods of separating saturated and unsaturated hydrocarbon gases since the halides are not soluble to an appreciable extent in the reaction mixture.

The exhausted reaction solution may be drawn off periodically or continuously. The disposal of the exhausted reaction solution presents little difficulty since the exhausted solution is principally a solution of sodium chloride.

A modified embodiment of the absorption tower is depicted in Figs. 4, 5, 6, 7, 8 and 9. The modified embodiment has practically the same construction as the tower illustrated in Figs. 1 to 3 with the exception that different means are provided for introducing the various reactants into and removing the gases from the reaction vessel. In Figs. 4 and 5 the main elements including the framework, cylinders, external piping etc. are the same as in Figs. 1 and 2, and will be designated by the same reference characters.

The hydrocarbon gas enters the system at valve 41, passes through pipe 33, reducer 34 and valve 35 to pass through pipe 33a into distributor 24b and diffuses or bubbles as finely dispersed globules or bubbles of gas into the liquid reactant through a bubbling or dispersing element 25b at a point near the lower extremity of the reaction vessel 11. The halogen enters the system through valve 40, conduit 42, reducer 43 and valve 37 and passes through connecting pipe 42a into distributor 24a. From the distributor, the halogen passes into the liquid reactant through a dispersing device 25a similar to 25b which may be of sintered glass or a porous cup or thimble at a point somewhat above the point at which the hydrocarbon gases enter the liquid. The liquid reaction products and liquid reactants are drawn off at valve 12 as in the other embodiment of the tower.

By referring to Fig. 5 the means of introducing liquid reactants, such as water or aqueous solutions, of bromides, through connection 47 is shown. Pipe 48 provides an outlet for unreacted gases and is connected with trap 23 which may be connected with others not shown for the entrapment of entrained reactants, such as bromine carried by the outlet gases.

The details of the layout of the cover 20 and the gas distributing units are illustrated in Figs. 6, 7, 8 and 9. Fig. 6 is a top elevation of cover 20 showing the hydrocarbon and inert gas inlet 33a, halogen gas inlet 42a, liquid reactant inlet 47 and an outlet for unreacted and/or inert gases 48. The spatial relation of the gas distributing system units is given in detail in Fig. 7. The hydrocarbon and inert gas distributing unit consists of a non-corrosive conduit 24b and a dispersing or bubbling element 25b. The corresponding elements of the halogen gas distributing system are designed as 24a and 25a. The segment 44 of the tapered portion of reaction vessel 11 connects by any suitable means with the valve 12 (Fig. 5). By referring to Fig. 8 and Fig. 9, which are respectively a top and a side elevation of the dispersing or bubbling elements of the distributing system it is readily seen that they may be of the porous cup or thimble type of corrosion-resistant material or of sintered glass. As is well-known to those skilled in the art the number of units in the gas distributing system may be varied.

I claim:—

1. A mobile absorption tower comprising a frame, platforms for receivers and traps, a metallic protective vessel attached to said frame and supported thereby having suitably flanged extremities, a plurality of peep-holes for observing the course of the reaction, an inner glass vessel, a ring of resilient material toward the upper extremity of said protective vessel to guide and maintain said glass reaction vessel in spaced relation within said protective vessel, a mass of resilient material toward the lower extremity of said protective vessel to support and cushion said reaction vessel, a pipe projecting through said resilient mass toward the lower extremity of the protective vessel and joined to said flanged extremity of said protective vessel and connecting said reaction vessel to an external drain pipe and valve for delivery of liquid products of the reaction to a receiver, a flanged cover making a gas-tight joint with said protective vessel and said reaction vessel, a gooseneck positioned on said cover for the introduction of solutions and escape of gases and entrained reactants, a T for the introduction of gaseous reactants to a distributing device in said reaction vessel, a corrosion-resistant tube connected to said T for conducting gaseous reactants toward the lower extremity of said reaction vessel, a plurality of ports provided in said tube for dispersing gaseous reactants in the lower part of the liquid reactant medium, suitable piping to conduct gaseous reactants separately to said T, suitable piping to introduce cooling fluid into a jacket formed by said reaction vessel and said protective vessel and remove said cooling fluid from said jacket, a suitable trap to remove entrained reactants from escaping gases and a receiver for liquid reaction products.

2. A mobile absorption tower comprising a distributing tube of glass provided with a plurality of ports at one extremity for dispersing gaseous reactants in a liquid reactant, a tapered glass reaction vessel in spaced relation within a protective vessel and provided with a connection at said tapered extremity to a drain valve for removing liquid reaction products, a resilient mass within said protective vessel and surrounding said tapered extremity of reaction vessel and said connection to cushion said reaction vessel, a ring of resilient material toward the upper extremity of said reaction vessel to hold said reaction vessel in spaced relation within said protective vessel, a protective vessel having the extremities flanged surrounding said reaction vessel being substantially impermeable to actinic rays and forming a jacket between said reaction vessel and said protective vessel, a flanged cover forming a gas- and liquid-tight connection with said reaction vessel and said protective vessel, tubes for introducing gaseous reactants and connected to the distributor, a gooseneck on said cover for introducing liquid reactants and removal of gaseous products of the reaction and entrained liquid reactants, a baffled trap connected to said gooseneck for removal of said entrained reactants, piping for conveying gaseous reactants to the tubes in said cover of said protective vessel, piping for introducing cooling fluid into the jacket formed by said reaction vessel and said protective vessel and for removing said cooling fluid from said jacket and a receiver connected with the drain valve for liquid products of the reaction.

3. A mobile absorption tower comprising a protective metal vessel having flanged extremities, a cover suitably flanged to form a gas- and liquid-tight joint with said protective vessel and an inner corrosion-resistant reaction vessel, a connection positioned on said cover for introducing gaseous reactants, a connection for removing gases and entrained reactants and for introducing liquid reactants, said protective vessel being provided with an inlet and an outlet for cooling medium, peepholes below the median line of said protective vessel, a drain pipe and valve connecting with an inner reaction vessel for removing liquid reaction products to a receiver, a receiver connected with said drain valve for removing liquid reaction products, a ring of resilient material toward the upper extremity of said protective vessel for holding an inner reaction vessel in spaced relation with said protective vessel, an inner reaction vessel of corrosion-resistant material in spaced relation within said protective vessel and tapered at the lower extremity to fit a connection for removing liquid reaction products from said reaction vessel, a mass of resilient material within said protective vessel and surrounding said tapered extremity of said inner reaction vessel and said connection and serving to cushion said reaction vessel, piping for conveying gaseous reactants separately to said reaction vessel, means of introducing gaseous reactants in a state of fine dispersion into said liquid reactants, piping for conveying cooling fluid to a jacket formed by said reaction vessel and said protective vessel, a trap for removing reactants entrained in gases removed from the reaction vessel, and a frame of suitable metal supporting said vessels and auxiliaries whereby said absorption tower is made portable.

4. A mobile absorption tower comprising a protective vessel of material substantially impermeable to actinic rays, flanged extremities on said protective vessel, an inner reaction vessel, in spaced relation within said protective vessel, a flange on one extremity of said reaction vessel, a cover for said vessels having a flange to cooperate with said flanges of said vessels and to form a fluid-tight joint therewith, a member on said cover for introducing gaseous reactants, a corrosion-resistant element connected to said member for distributing said gaseous reactants in said reaction vessel, a plurality of ports in said element for dispersing said gaseous reactants in a liquid reactant, an element in said cover for introducing liquid reactants into said reaction vessel and withdrawing gases from said reaction vessel, an outlet at the lower extremity of said reaction vessel connecting with a cooperating outlet at the lower extremity of said protective vessel for withdrawing liquids, a jacket interposed between said protective vessel and said reaction vessel, a port in said protective vessel for introducing cooling fluid into the jacket interposed between said protective vessel and said reaction vessel and a port in said protective vessel for withdrawing said cooling fluid from said jacket.

5. A mobile absorption tower comprising a shell substantially impermeable to actinic rays, an inner corrosion-resistant reaction chamber, a jacket of cooling fluid interposed between said protective vessel and said reaction vessel, a flange on said protective vessel, a flange at one extremity of said reaction chamber, a cover for said protective vessel and said reaction chamber having a flanged portion to cooperate with said flanged portions of said protective vessel and said reaction chamber, an element on said cover connected with members within said reaction vessel for introducing gaseous reactants, a port in said cover for introducing liquid reactants and for withdrawing gases, a distributor for dispersing gaseous reactants in liquid reactants, an element joining said reaction chamber and said protective vessel for removal of liquids and suitable piping.

CESARE BARBIERI.